United States Patent
Jalali et al.

(10) Patent No.: US 10,735,284 B2
(45) Date of Patent: Aug. 4, 2020

(54) SYSTEM AND METHOD FOR MANAGING A MOVING PEER-TO-PEER NETWORK

(71) Applicant: International Business Machines Corporation, Armonk, NY (US)

(72) Inventors: Fatemeh Jalali, Hawthorn East (AU); Ramachandra Rao Kolluri, Balaclava (AU); Timothy M. Lynar, Melbourne (AU); Frank Suits, Brighton (AU)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 15/843,202

(22) Filed: Dec. 15, 2017

(65) Prior Publication Data

US 2019/0190802 A1 Jun. 20, 2019

(51) Int. Cl.
| | | |
|---|---|---|
| G06F 15/173 | (2006.01) | |
| H04L 12/26 | (2006.01) | |
| H04L 29/08 | (2006.01) | |
| H04L 12/911 | (2013.01) | |
| G06N 20/00 | (2019.01) | |
| H04L 12/24 | (2006.01) | |

(52) U.S. Cl.
CPC .......... *H04L 43/045* (2013.01); *G06N 20/00* (2019.01); *H04L 41/0896* (2013.01); *H04L 41/12* (2013.01); *H04L 47/70* (2013.01); *H04L 67/104* (2013.01); *H04L 41/147* (2013.01); *H04L 43/0852* (2013.01); *H04L 43/0894* (2013.01)

(58) Field of Classification Search
CPC ... H04L 43/045; H04L 41/0896; H04L 41/12; H04L 47/70; H04L 67/104; H04L 41/147; H04L 43/0852; H04L 43/0894; G06N 20/00
USPC .......................................................... 709/224
See application file for complete search history.

(56) References Cited

U.S. PATENT DOCUMENTS

| | | |
|---|---|---|
| 7,336,613 B2 | 2/2008 | Lloyd et al. |
| 7,403,988 B1 | 7/2008 | Blouin et al. |

(Continued)

OTHER PUBLICATIONS

Aazam, Mohammad et al.; "Fog Computing Micro Datacenter Based Dynamic Resource Estimation and Pricing Model for IoT"; 2015 IEEE 29th International Conference on Advanced Information Networking and Applications; Copyright 2015 IEEE; pp. 687-694.

(Continued)

*Primary Examiner* — Atta Khan
(74) *Attorney, Agent, or Firm* — William H. Hartwell

(57) ABSTRACT

A system, method and program product for managing a moving peer-to-peer network. A system is provided that a node tracking system that collects tracking information of nodes in a moving P2P network including position, connection status and computation capability; a network representation system that stores the tracking information in a dynamic graph that specifies nodes and connections between the nodes; a task manager for receiving a task submitted by a requesting node for a service implemented by a provider node; and a network allocation system that determines and allocates an optimal path back and forth between the requesting node and the provider node, wherein the optimal path is selected to minimize an overall wall-time, and wherein the network allocation system estimates future positions of moving nodes for determining the optimal path.

14 Claims, 3 Drawing Sheets

(56) References Cited

U.S. PATENT DOCUMENTS

| | | | |
|---|---|---|---|
| 7,681,203 | B2 | 3/2010 | Mandato et al. |
| 2007/0253341 | A1 | 11/2007 | Atkinson et al. |
| 2009/0300173 | A1 | 12/2009 | Bakman et al. |
| 2010/0131590 | A1 | 5/2010 | Coleman et al. |
| 2011/0041136 | A1* | 2/2011 | Messier ............... G06F 9/5066 718/105 |
| 2016/0174106 | A1* | 6/2016 | Lee ..................... H04W 28/10 705/14.63 |

OTHER PUBLICATIONS

Asheralieva, Alia et al.; "A Predictive Network Resource Allocation Technique for Cognitive Wireless Networks"; School of Electrical Engineering and Computer Science; The University of Newcastle; Copyright 2010 IEEE; pp. 9.

Mohan, Nitinder et al.; "Edge-Fog Cloud: A Distributed Cloud for Internet of Things Computations"; IEEE; Copyright 2016 IEEE; pp. 6.

Song, Ningning et al.; "Fog Computing Dynamic Load Balancing Mechanism Based on Graph Repartitioning"; Network Technology and Application; China Communications; Mar. 2016; pp. 156-164.

Sun, Xiang et al.; PRIMAL: PRofIt Maximization Avatar pLacement for Mobile Edge Computing; IEEE ICC 2016—Next Generation Networking and Internet Symposium; Copyright 2016 IEEE; pp. 6.

Verma, Manisha et al.; "Real Time Efficient Scheduling Algorithm for Load Balancing in Fog Computing Environment"; I.J. Information Technology and Computer Science; 2016; 4; Published Online Apr. 2016 in MECS; Copyright 2016 MECS; pp. 1-10.

Yannuzzi M et al.; "Key ingredients in all IoT receipt: Fog Computing, Cloud Computing, and more Fog Computing"; pp. 325-329.

Zhang, Huaqing et al.; Computing Resource Allocation in Three-Tier IoT Fog Networks: a Joint Optimization Approach Combining Stackelberg Game and Matching; pp. 10.

Disclosed Anonymously; "Method and System for Offloading Jobs from Data Centers to Individual Computing Nodes"; ip.com; IP.com No. IPCOM000248597D; IP.com Electronic Publication Date: Dec. 21, 2016; pp. 3.

Nishio, Takayuki et al.; "Service-Oriented Heterogeneous Resource Sharing for Optimizing Service Latency in Mobile Cloud"; MobileCloud '13; Jul. 29, 2013; Bangalore, India; Copyright 2013; pp. 19-26.

Mohan, Nitinder et al.; "Managing Data in Computational Edge Clouds"; Proceeding MECOMM '17 Proceedings of the Workshop on Mobile Edge Communications; Los Angeles, CA; Aug. 21, 2017; pp. 6.

\* cited by examiner

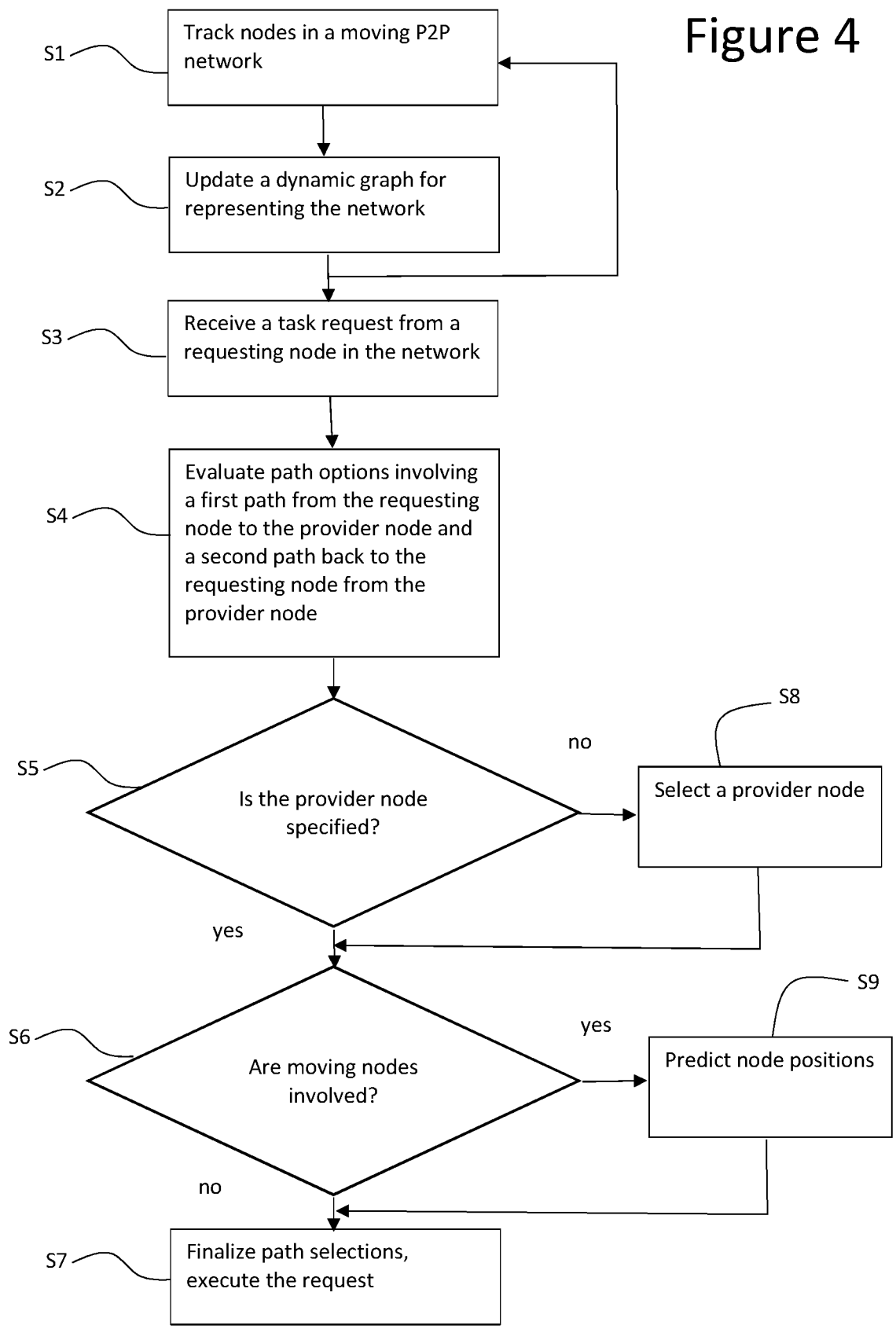

SYSTEM AND METHOD FOR MANAGING A MOVING PEER-TO-PEER NETWORK

TECHNICAL FIELD

The subject matter of this invention relates to moving peer-to-peer networks and more particularly to a system and method of dynamically configuring connections in a moving peer-to-peer network.

BACKGROUND

In today's world, more and more devices utilize network connections to function. For stationary devices in an Internet of Things (IoT) environment, such as home appliances, machinery, etc., traditional Internet-based client-server connectivity using wired or wifi protocols provides a straightforward solution. In other cases, where direct connectivity among the devices is required, a peer-to-peer (P2P) network may provide a more robust solution. For example, in a remote sensor network with limited Internet connectivity, a collection of sensors may be arranged in a P2P grid that allows individual nodes to communicate with and through each other.

Challenges however arise in systems of moving devices, such as drones, autonomous vehicles, etc. While a P2P network could be a useful approach for moving devices, difficulties arise as distances between devices change, devices come and go from the network, bandwidth requirements change, and latency issues arise.

SUMMARY

Aspects of the disclosure provide a system and method for managing a moving peer-to-peer (P2P) network. A moving P2P network is a network where one or more nodes are moving or will move in the near future. For instance in the Internet-of-Things (IoT) space, an autonomous car or smart device may be a node that moves and is a member of a moving P2P network. Aspects of the current solution dynamically configure the limited connections available between nodes in a moving P2P network. In particular, heuristics are provided to optimally establish and maintain connections between nodes on a moving peer-to-peer network to minimize total task compute time across the network.

A first aspect discloses a moving peer-to-peer (P2P) network manager, comprising: a node tracking system that collects tracking information of nodes in a moving P2P network including position, connection status and computation capability; a network representation system that stores the tracking information in a dynamic graph that specifies nodes and connections between the nodes; a task manager for receiving a task submitted by a requesting node for a service implemented by a provider node; and a network allocation system that determines and allocates an optimal path back and forth between the requesting node and the provider node, wherein the optimal path is selected to minimize an overall wall-time, and wherein the network allocation system estimates future positions of moving nodes for determining the optimal path.

A second aspect discloses a computer program product stored on a computer readable storage medium, which when executed by a computing system, manages a moving peer-to-peer (P2P) network, the program product comprising: program code that collects tracking information of nodes in a moving P2P network including position, connection status and computation capability; program code that stores the tracking information in a dynamic graph that specifies nodes and connections between the nodes; program code for receiving a task submitted by a requesting node for a service implemented by a provider node; and program code that determines and allocates an optimal path back and forth between the requesting node and the provider node, wherein the optimal path is selected to minimize an overall wall-time, and wherein the network allocation system estimates future positions of moving nodes for determining the optimal path.

A third aspect discloses a computerized method that manages a moving peer-to-peer (P2P) network, comprising: collecting tracking information of nodes in a moving P2P network including position, connection status and computation capability; storing the tracking information in a dynamic graph that specifies nodes and connections between the nodes; receiving a task submitted by a requesting node for a service implemented by a provider node; and determining and allocating an optimal path back and forth between the requesting node and the provider node, wherein the optimal path is selected to minimize an overall wall-time, and wherein the network allocation system estimates future positions of moving nodes for determining the optimal path.

BRIEF DESCRIPTION OF THE DRAWINGS

These and other features of this invention will be more readily understood from the following detailed description of the various aspects of the invention taken in conjunction with the accompanying drawings in which:

FIG. 4 shows a flow diagram of a method of managing a moving P2P network.

Figure 1:
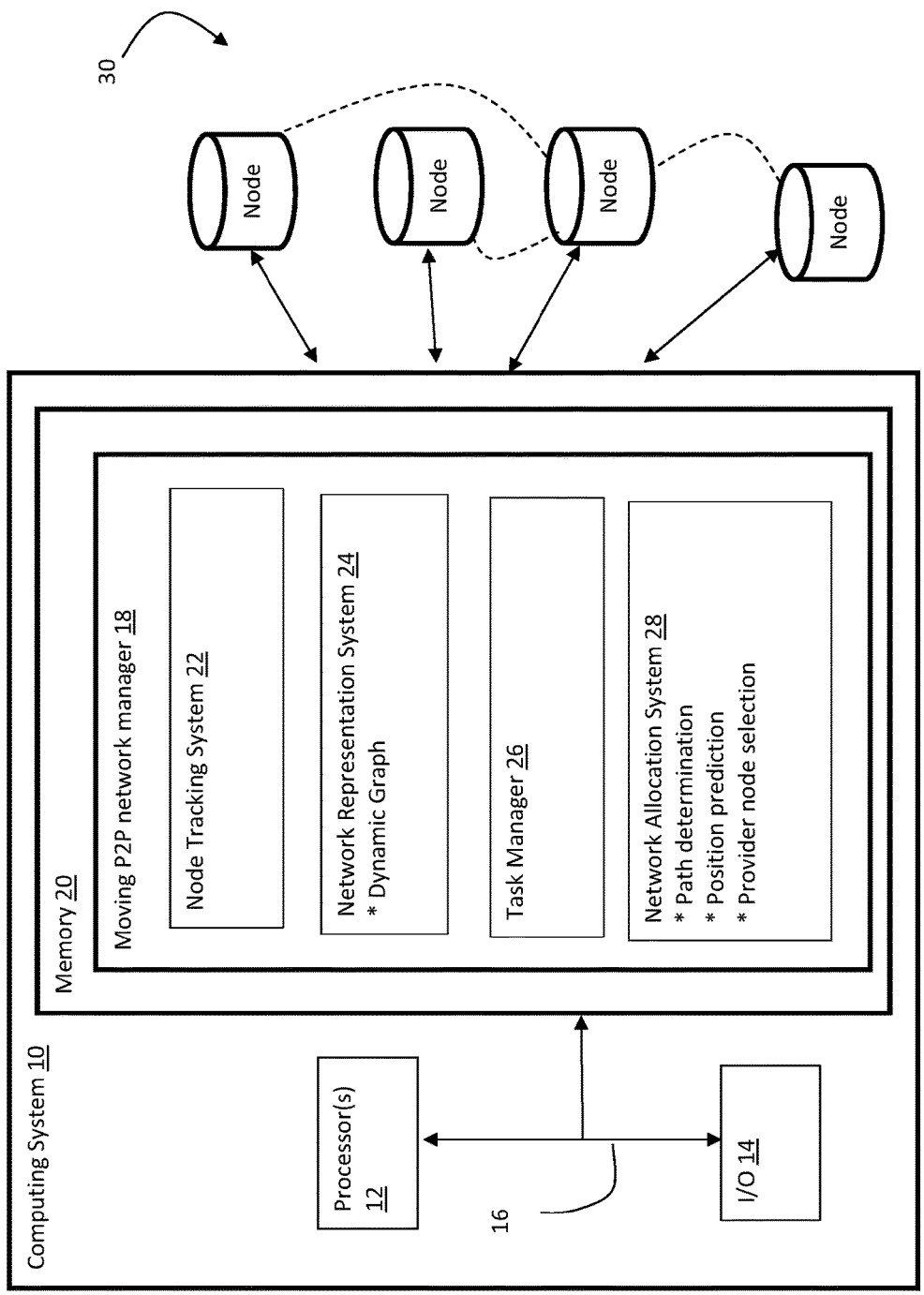
FIG. 1 shows a computing system having a moving P2P network manager according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Referring now to the drawings, FIG. 1 depicts a computing system 10 having a moving peer-to-peer (P2P) network manager 18 for managing a set of moving nodes in a network 30, which together form a P2P system. Moving P2P network manager 18 generally includes: a node tracking system 22 that collects tracking information of nodes in the moving P2P network 30, including location, availability, computational capabilities and other information; a network representation system 24 that provides and updates a dynamic data structure for representing the tracking information collected for nodes in the network 30; a task manager 26 that manages requested tasks being handled by nodes in the network; and a network allocation system 28 that evaluates and allocates connections and bandwidth for nodes in the network 30, determines optimal paths, and estimates positions of moving nodes.

P2P network 30 may for example be implemented with a virtual overlay network on top of a physical network topology, where the nodes in the overlay form a subset of the nodes in the physical network. Data is for example still exchanged directly over the underlying network (such as TCP/IP), but at the application layer nodes are able to communicate with each other directly, via logical overlay links (each of which corresponds to a path through the underlying physical network). Overlays are used for indexing and peer discovery, and make the P2P system independent from the physical network topology.

Given the fluid nature of the moving P2P network 30, the implementation may be handled as an unstructured P2P system in that a particular structure is not imposed on the overlay network by design, but rather the structure is created by nodes that randomly form connections to each other (shown by dashed lines). The described embodiments facilitate these connections.

Node tracking system 22 may utilize any process for collecting tracking information for nodes in the network 30. For example, tracking information may be collected directly from nodes periodically or on demand using standard internet protocol techniques, or via other nodes that collect and pass along data.

Once obtained, tracking data is stored by network representation system 24 as, e.g., a dynamic graph G=(N, E), where N is the set of nodes and E is a matrix representing the connection between nodes. Each node is characterized by a number of parameters, such as its geographical position, pos, computation power per unit time, cpu, and maximum number of connections it can make at a single time, maxcon. Connections between nodes i j are represented as edges in which each edge is characterized by parameters such as: length $l_{ij}$, latency $d_{ij}$, available bandwidth $bw_{ij}$ and connection status $s_{ij}$ (which is a binary value of 0 or 1). Note that $s_{ii}$ is always zero. The dynamic graph may store tacking information over time t, and may store node estimation information such as future predicted positions and predicted capabilities of moving nodes.

Other parameters may likewise be collected and tracked, such as characteristic that determines connection capabilities, including protocol based bandwidth limitations and power consumption, etc. For example, if a node is based on battery power, the battery status may be a key factor. This status also must be estimated if the node does not update the network manager of its status for a long period.

Nodes within the network 30 may at any time require a service (i.e., a task) from other nodes. For example, a first node at a first location may require traffic or weather information from a second node at a second location. Task manager 26 is responsible for receiving, managing and tracking such tasks among nodes, including processing inputted requests and outputting completion statuses. Nodes can play different roles depending on the requirements and needs of other nodes at a given point in time. Each node can be one of the following at any time:

(1) Origin nodes are the nodes that originate a request for a task (tsk). Note that origin nodes may initiate requests for themselves or on behalf of a third party requester nodes;
(2) Requesting nodes are resource consumers at which the results of a task tsk are required. In the simple case, including the examples herein, the requesting node and the origin node are the same node, which may be simply referred to herein as a requesting node.
(3) Compute (i.e., provider) nodes are the resource providers at which the computation of task tsk is carried out.
(4) Intermediary nodes act as connection peers for data transfer between nodes. Bandwidth of any network connection is limited by the minimum bandwidth amongst all nodes in the connection including the intermediary nodes. The network connection manager will take this bandwidth limitation into consideration while driving network connections.

When a task is requested, task manager 26 generally collects various information such as: an input data size associated with the task, $tsk_{in}$, an estimate of the processing power required to perform the task, $tsk_{cpu}$, and an estimate on the resulting outputted data size $tsk_{out}$. Note that a requesting node i could in some cases compute the task tsk itself or allocate the task to another provider node.

When a task is received from a requesting node that must be serviced by another provider node, network allocation system 28 is employed to evaluate different paths to determine the optimal path to handle the request. A primary factor in the evaluation is the amount of time it will take to service the task. Wall-time, $T_{wall}$ is the total time taken to compute a specified task tsk submitted from node i, computed by node j, and return the results back to node i. Wall-time can be defined as follows:

$$T_{wall} = T_{input} + T_{compute} + T_{output}$$

Where $T_{input}$ is the time taken to send the required data for computation, $T_{compute}$ is the time taken to compute the task at the resource provider node j, and $T_{output}$ is the time taken to transmit the results to the origin node from compute node. $T_{input}$ may be computed as $$T_{input,ij} = tsk_{in} \times f(l_{reqpath,ij}, d_{reqpath,ij}, bw_{reqpath,ij}),$$

where f( ) is a known/estimated time function and reqpath,ij is the path used from the requesting node to send the request and input data to the resource provider node. Similarly, $T_{output}$ may be computed as $$T_{output,ij} = tsk_{out} \times f(l_{respath,ij}, d_{respath,ij}, bw_{respath,ij}),$$

Where $respath_{ij}$ is the network path that is followed after the compute at the provider node back to the requesting node. Note that it is assumed that all intermediary nodes in either $respath_{ij}$ or $reqpath_{ij}$ act as zero latency gateways. It is important to note that the bandwidth $bw_{respath,ij}$ is equal to the bandwidth of any slowest intermediary link in the path. $T_{compute}$ may be calculated as:

$$T_{compute,ij} = cpu_j \times tsk_{cpu}.$$

Alternatively, the compute time may be calculated using machine learning and/or a heuristic that evaluates past behaviors.

Figure 2:
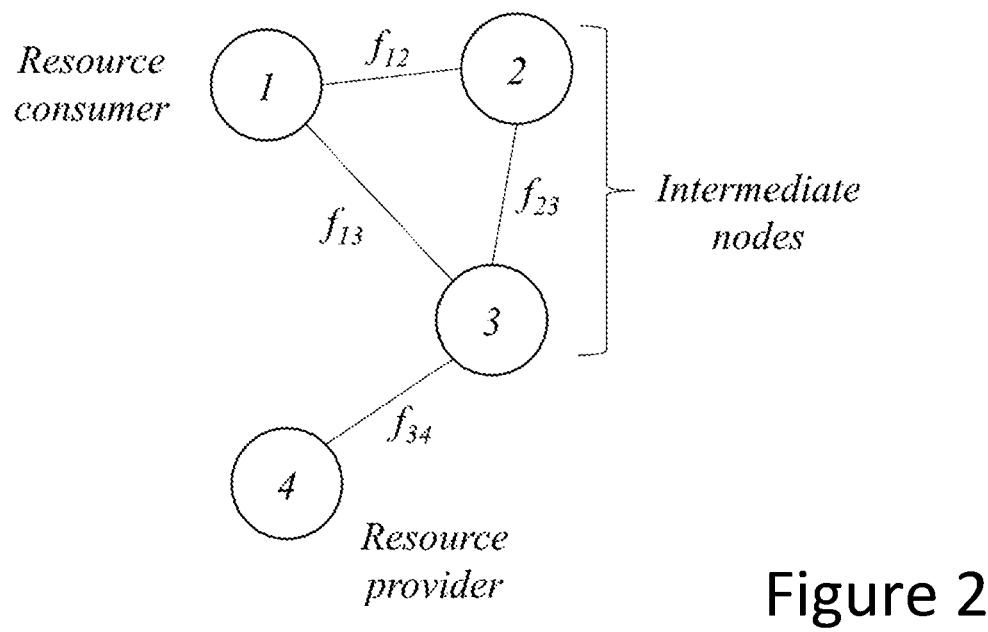
FIG. 2 shows a first instance of a moving P2P network according to embodiments.

FIG. 2 depicts an illustrative four node network with node 1 being the resource consumer and node 4 being the resource provider. Nodes 2 and 3 are the intermediate nodes. The parameters may for example be calculated as: $reqpath_{14} = respath_{14} = min(f12+f23+f34, f13+f34)$.

The goal of network allocation system 28 is to find an optimal network path that will result in the lowest wall-time when a task request is submitted. More particularly, given an inputted resource requesting node i, a resource provider node j and task tsk, there are several possible cases that must be considered. Firstly, if the position of both nodes i and j are fixed (i.e., not moving), then the wall-time computation is relatively straight forward using the above equations.

In the second case, the position of nodes i and j may be variable (i.e., one or both are in motion). In this case, the future position of nodes i and j must be predicted. A movement time window along with the compute time window must be considered.

In the third case, the position of the requesting node is variable, and the identity of the provider node j is unknown (i.e., it is not specified which node in the network is best suited to fulfill the resource request). In this case, the position of requesting node i must be estimated and the identity of the most suitable provider node j must be determined and its position estimated. Determining the identity of the provider node may be done by analyzing historical data with a heuristic, utilizing machine learning, or any other technique. For example, network allocation system may first determine the set of possible nodes capable of providing the task, and then determine which will result in the optimal path Like the second case, a movement time window along with the compute time window must be considered.

As noted for the fixed position case, the solution is relatively straightforward and may be given by:

$$\min_{respath_{ij}, reqpath_{ij}} T^{tsk}_{wall,ij}$$

Subject to $$1 \leq \sum_{j \in N} s_{ij} \leq maxcon_i, \forall j \in N,$$

The above equation provides an approach to finding the respath and reqpath between nodes i,j which produces a minimum wall-time for a task tsk subject to the constraint which restricts the connection status of any node to be within the maximum number of connections it can make at any given time maxcon, i.

For the second case in which the positions of nodes i and j may vary, the following approach may be utilized. For every node-to-node step, an estimate of node positions is determined and stored in an associated edge matrix $E^t$ (that includes estimated future node positions at different times t). The decision variables include $respath_{ij}$ and $reqpath_{ij}$, along with a connection time $T_{connection}$. Accordingly, the wall-time for this case is now:

$$T_{wall} = T_{input} + T_{compute} + T_{output} + T_{connection}$$

Accordingly, the amount of time the resource provider takes to compute the task along with the new connection times are considered. The new problem is given by:

$$\min_{respath_{ij}, reqpath_{ij}} T^{tsk}_{wall,ij}$$

subject to $$1 \leq \sum_{j \in N} s_{ij} \leq maxcon_i, \forall j \in N,$$

Over a time window $t+T_{wall}$ and each path satisfies range constraints for the nodes.

Figure 3:
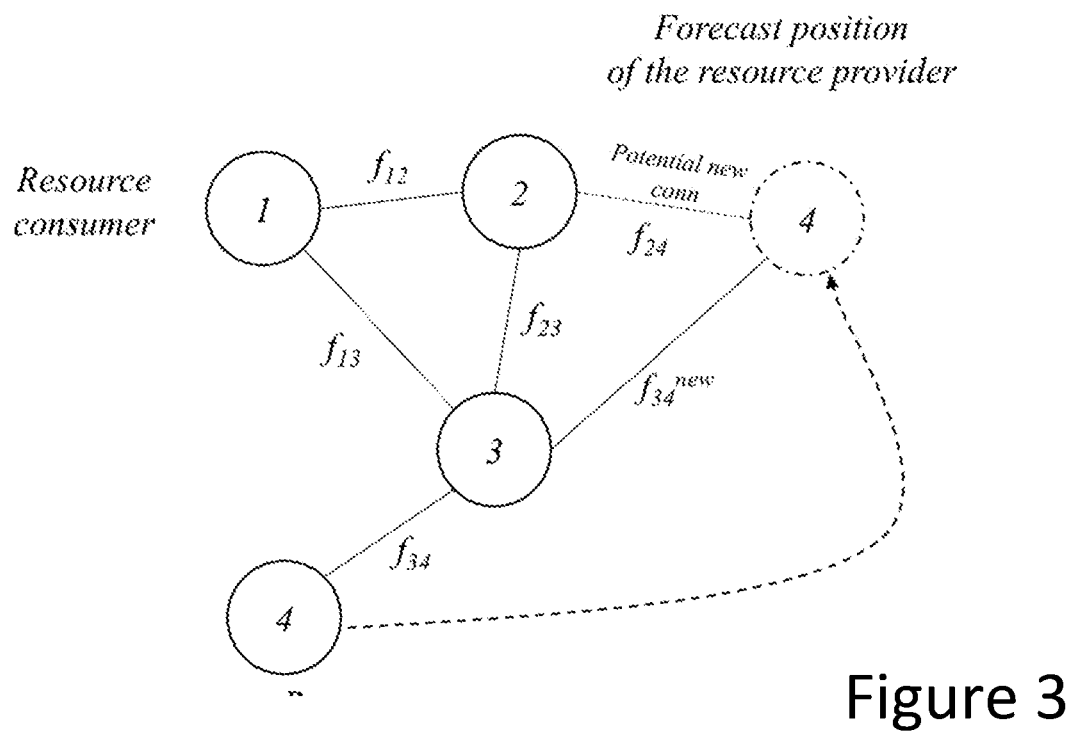
FIG. 3 shows a second instance of a moving P2P network according to embodiments.

FIG. 3 depicts a further example of a four node network with node 1 being the resource consumer and node 4 being the resource provider. Nodes 2 and 3 are the intermediate nodes. The parameter $reqpath_{14} = \min(f_{12}+f_{23}+f_{34}, f_{13}+f_{34})$. However, during time $T_{input}+T_{compute}$ the predicted position of node four changed position, such that $respath_{14} = \min(f_{12}+f_{23}+f_{34new}, f_{13}+f_{34new}, f_{12}+f_{24})$. For evaluating $T_{wall}$ with $respath_{14}=f_{12}+f_{24}$, it is important to consider the time taken by node 2 to connect to node 4. If the compute node 4 can compute and connect simultaneously, $T_{compute}+T_{connection}=\max(T_{compute}, T_{connection})$, else it is the sum of the former.

Connection time is the time allocated to allow for connection between nodes, for example, a Wifi connection between nodes can take a few milliseconds to complete. This includes authentication, obtaining the IP address, etc. Therefore, the wall-time calculation must consider Tconnection. It is also noted that if making connections needs CPU resources—this may significantly reduce CPU availability for task computation. However, similar learning and estimation techniques could be applied to understand the behavior of these parameter as well.

Note that solving an optimal path algorithm for known positions is an NP (nondeterministic polynomial time) hard problem and is very difficult to solve with limited resources in real time. The problem becomes prohibitively hard and stochastic for unknown positions. Therefore, the network allocation system 28 may use historical data, regression and machine learning (segmentation, support vector machine, etc.) to understand the task requirements, estimate node positions and allocate resources based on simple heuristics.

Note that in FIG. 3 case, node 1 and node 4 did not connect. The reason may for example be that they are too far from each other and cannot connect directly, making an intermediate node necessary.

For the third case in which a position of the requesting node i varies and the identity of the provider node j is unknown, the provider node j must be determined, e.g., using heuristics and machine learning. Identity of the provider node may also be determined using any selection, prediction or forecasting methodology, similar to the case where the position of the provider node j is predicted.

Accordingly, in the third case, network allocation system 28 includes a position prediction algorithm to predict or estimate a future position of nodes and a selection algorithm for selecting a provider node when one is not specified. As discussed, network allocation system 28 can predict the future position of a node based on historical data and/or machine learning. Predictions can be added into a system model (e.g., using $E^t$) to figure out the best solution (in compute time terms) for any given task. It is important that the time taken by nodes for their movement is taken into account, making the solution non-causal.

Rather than solving the problem using optimization techniques (which are computation intensive), heuristics can be used to drive the connection decisions in most applications. For example, based on regressing historical data in positions and using previous decisions from similar scenarios, estimating the optimality gap between implemented decisions and available decision followed by subsequent learning (a cyclic process) may be employed. The implementation and learning can result in significant training leading to better results over time. Illustrative heuristics that could be employed herein include: random, network performance weighted, compute weighted, compute and distance weighted, and distance weighted only.

FIG. 4 depicts a flow diagram of a process for implementing the moving P2P network manager 18 shown in FIG. 1. At S1, nodes in a moving P2P network 30 are tracked and at S2 a dynamic graph representing the nodes is updated. Steps S1 and S2 continuously repeat. At S3, a task request is received from a requesting node in the network 30. At S4, the path options are evaluated by network allocation system 28 to determine an optimal path (i.e., a first path from the requesting to the provider node and a second path back to the requesting node from the provider node). At S5, a determination is made whether the provider node is specified. If no, a provider node is selected at S8 (e.g., using historical data, a heuristic, machine learning, etc.). If yes, then a determination is made at S6 whether there are moving nodes involved in the proposed paths being evaluated. If yes, then node positions are estimated at S9. Finally, at S7, path selections are finalized, and the request is executed along the selected paths.

It is understood that moving P2P network manager 18 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 10 that may comprise any type of computing device and for example includes at least one processor 12, memory 20, an input/output (I/O) 14 (e.g., one or more I/O interfaces and/or devices), and a communications pathway 16. In general, processor(s) 12 execute program code which is at least partially fixed in memory 20. While executing program code, processor(s) 12 can process data, which can result in reading and/or writing transformed data from/to memory and/or I/O 14 for further processing. The pathway 16 provides a communications link between each of the components in computing system 10. I/O 14 can comprise one or more human I/O devices, which enable a user to interact with computing system 10. Computing system 10 may also be implemented in a distributed manner such that different components reside in different physical locations.

Furthermore, it is understood that the moving P2P network manager 18 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computer system for managing a moving peer-to-peer (P2P) network, the computer system comprising:
   one or more computer processors;
   one or more computer readable storage devices; and
   program instructions stored on the computer readable storage devices for execution by at least one of the one or more computer processors, the stored program instructions comprising:
   program instructions to collect tracking information of nodes in the moving P2P network including position, connection status and computation capability;
   program instructions to store the tracking information in a dynamic graph that specifies nodes and connections between the nodes;
   program instructions to receive a task submitted by a requesting node for a service implemented by a provider node; and
   program instructions to determine an optimal path back and forth between the requesting node and the provider node, wherein the optimal path is selected to minimize an overall wall-time, wherein the overall wall-time includes a time to transmit the request to the provider node plus a time to compute the task by the provider node plus a time to transmit the response back to the requesting node, and wherein the time to transmit the request to the provider node is computed as the size of the task multiplied by the sum of the length of the path, the latency of the path, and the available bandwidth of the path.

2. The computer system of claim 1, wherein the dynamic graph further tracks a maximum number of connections the node can make at a single time, a length of a path between nodes, a latency of the path, and an available bandwidth of the path.

3. The computer system of claim 1, wherein the time to compute the task is computed using one of:
   the size of the task multiplied by a computation power per unit time of the provider node; or
   a machine learning algorithm.

4. The computer system of claim 1, the stored program instructions further comprising:
   program instructions to estimate future positions of moving nodes using a heuristic or machine learning that considers prior behavior of the moving nodes.

5. The computer system of claim 1, wherein the program instructions to determine the provider node when the provider node is unspecified based on one of a heuristic or machine learning.

6. A computer program product for managing a moving peer-to-peer (P2P) network, the computer program product comprising:
   one or more computer readable storage devices and program instructions stored on the one or more computer readable storage devices, the stored program instructions comprising:
   program code that collects tracking information of nodes in the moving P2P network including position, connection status and computation capability;
   program code that stores the tracking information in a dynamic graph that specifies nodes and connections between the nodes;
   program code for receiving a task submitted by a requesting node for a service implemented by a provider node; and
   program code that determines an optimal path back and forth between the requesting node and the provider node, wherein the optimal path is selected to minimize an overall wall-time, wherein the overall wall-time includes a time to transmit the request to the provider node plus a time to compute the task by the provider node plus a time to transmit the response back to the requesting node, and wherein the time to transmit the request to the provider node is computed as the size of the task multiplied by the sum of the length of the path, the latency of the path, and the available bandwidth of the path.

7. The program product of claim 6, wherein the dynamic graph further tracks a maximum number of connections the node can make at a single time, a length of a path between nodes, a latency of the path, and an available bandwidth of the path.

8. The computer program product of claim 6, wherein the time to compute the task is computed using one of:
   the size of the task multiplied by a computation power per unit time of the provider node; or
   a machine learning algorithm.

9. The computer program product of claim 6, the stored program instructions further comprising program code that estimates future positions of moving nodes using a heuristic or machine learning that considers prior behavior of the moving nodes.

10. The computer program product of claim 6, the stored program instructions further comprising program code that determines the provider node when the provider node is unspecified based on one of a heuristic or machine learning.

11. A computerized method that manages a moving peer-to-peer (P2P) network, comprising:
    collecting tracking information of nodes in the moving P2P network including position, connection status and computation capability;
    storing the tracking information in a dynamic graph that specifies nodes and connections between the nodes;
    receiving a task submitted by a requesting node for a service implemented by a provider node; and
    determining an optimal path back and forth between the requesting node and the provider node, wherein the optimal path is selected to minimize an overall wall-time, wherein the overall wall-time includes a time to transmit the request to the provider node plus a time to compute the task by the provider node plus a time to transmit the response back to the requesting node, and wherein the time to transmit the request to the provider node is computed as the size of the task multiplied by the sum of the length of the path, the latency of the path, and the available bandwidth of the path.

12. The method of claim 11, wherein the dynamic graph further tracks a maximum number of connections the node can make at a single time, a length of a path between nodes, a latency of the path, and an available bandwidth of the path.

13. The method of claim 11, wherein the time to compute the task is computed using one of:
    the size of the task multiplied by a computation power per unit time of the provider node; or
    a machine learning algorithm.

14. The method of claim 11, further comprising:
    predicting future positions of moving nodes; and
    determining the provider node when the provider node is unspecified based on one of a heuristic or machine learning.

* * * * *